Nov. 19, 1957    R. KRESS    2,813,396
TAIL CONE AND RESILIENT MOUNTING THEREFOR
Filed Feb. 20, 1952    2 Sheets-Sheet 1

INVENTOR
RALPH KRESS

BY Strauch, Nolan & Diggins
ATTORNEYS

Nov. 19, 1957 R. KRESS 2,813,396
TAIL CONE AND RESILIENT MOUNTING THEREFOR
Filed Feb. 20, 1952 2 Sheets-Sheet 2

INVENTOR.
RALPH KRESS

BY Strauch, Nolan & Diggins
ATTORNEYS

United States Patent Office 2,813,396
Patented Nov. 19, 1957

2,813,396

TAIL CONE AND RESILIENT MOUNTING THEREFOR

Ralph Kress, La Mesa, Calif., assignor to Solar Aircraft Company, San Diego, Calif., a corporation of California Application February 20, 1952, Serial No. 272,541

7 Claims. (Cl. 60—39.32)

This invention relates to resilient mountings for absorbing vibrations between supporting and supported members, and has particular reference to such resilient mountings for use with the tailcone assembly of a gas turbine.

While it will become apparent as the disclosure proceeds that my invention has many applications, the preferred embodiment as described herein is particularly adapted for resiliently mounting the tailcone assembly of a gas turbine of the turbojet or ramjet type.

In the usual turbojet installation, air drawn into the engine is compressed in a first stage, admixed with fuel and burned in a combustion chamber; the hot products of combustion are then exhausted through an expansion turbine that drives a rotary compressor at the first stage. After passing through the turbine, these exhaust gases traverse a diffuser section comprising an outer cone or shell surrounding an inner cone, and pass through a tailpipe to emerge as a jet. Reaction of the jet produces forward propulsion of the airplane carrying the engine. Frequently the tailpipe carries an afterburner for the purpose of increasing the thrust of the jet by reheat.

The tailcone assembly, which provides downstream fairing for the expansion turbine hub, comprises an inner cone that is usually supported on substantially radial or transverse members extending between it and the outer shell. In the past these supporting members have followed a number of designs. For example, the early practice was to support the inner cone by means of transverse rods that extended through the cone and were secured to the outer shell. More recently the practice has been to slidably mount the inner cone on pins or studs extending inwardly through the outer shell into strut members attached to the inner cone. However, despite the many support designs that have been tried, structural failures have consistently occurred in the exhaust cones and particularly in the outer supporting shells because of the extremely high stresses therein resulting from the high velocity passage of exhaust gases and the extremely high temperatures and thermal stresses due to sharp temperature gradients. Vibrations and pulsations are set up by the primary engine and the afterburner, and these are frequently of extremely high amplitude due to resonance of the inner cone with certain harmonics of the vibrations transmitted either through the shell and studs or directly to the inner cone through the rough turbulent gases. These damaging vibrations result in considerable noise and eventually, often after only a few hours of operation, ruptures occur in the area where the stud is attached to the outer shell.

In general, the prior art has recognized the necessity of attaching the inner cone to the holding studs in a slidable manner to allow for thermal expansion of the inner cone relative to the outer shell. However, I have discovered that by providing a novel resilient connection between the stud and the outer shell, the previously dangerous vibratory transmission between the inner cone and the outer shell is entirely dampened, and the problems of noise and particularly rupture are overcome thus greatly lengthening the service life of the outer shell and solving the many other difficulties previously experienced.

Moreover, in addition to high frequency vibration stresses, I have noted the existence of secondary vibrations due to actual whipping of the tailcone and its displacement on its studs. This may result for example from unequal pressures in the charges from the upstream combustion chambers. Where the studs are fixed to the outer shell as formerly, these damaging vibrations are transmitted directly to the shell, and the condition becomes particularly dangerous and destructive when resonance exists between the tailcone and shell. These vibrations are dampened by my novel strut end connections with the shell.

Accordingly, it is a primary object of my invention to provide a resilient mounting which effectively dampens high pitched vibrations.

Another important object of my invention is to provide a resilient mounting for a gas turbine tailcone assembly which effectively dampens the high pitched sonic and ultra-sonic vibrations to which the assembly is subjected.

A further object of the invention is to provide a resilient tailcone assembly stud support which absorbs and dampens any vibrations having a tendency to pass from the assembly to the outer shell.

Another object of the invention is to provide a tailcone assembly mounting of simple construction to allow ready removal of the tailcone for inspection, repair or replacement.

Still another object of the invention is to provide a tailcone assembly mounting that is inexpensive to produce and easily and quickly assembled.

Other objects and advantages will become apparent from the following detailed description read in connection with the appended claims and the annexed drawings wherein:

Figure 1:
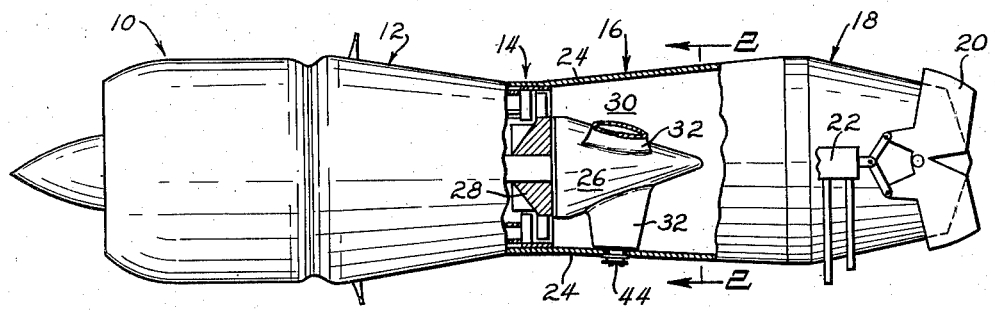
Figure 1 is a side elevation, partially in section, of a jet engine embodying my invention.

Referring now to the drawings, Figure 1 illustrates a turbojet engine having a compressor section 10, a combustion section 12, a turbine section 14, a diffuser section 16 and an afterburner section 18. A variable area nozzle 20 is shown mounted on the end of the afterburner tailpipe, and this nozzle may be operated by a suitable motor 22 such as a hydraulic actuator.

Figure 2:
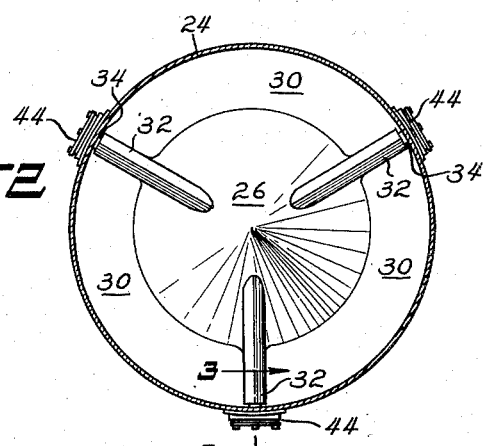
Figure 2 is a sectional elevation taken along line 2—2 of Figure 1.

The diffuser section 16 comprises an outer shell 24 and an inner tailcone 26 supported by the shell in a manner to be described. The tailcone 26 provides downstream fairing for the turbine hub 28, and with shell 24 define an annular diffusion passage 30 for the exhaust gases leaving the turbine. In the illustrated embodiment tailcone 26 is provided with three radially extending supporting struts 32, although additional struts may be employed. The struts 32 are of such length that there will be a small clearance 34, Figures 2 and 3, between the ends of the upper struts and the inside surface of shell 24 when the engine is in inoperative condition. This clearance allows for relative expansion or contraction between the tailcone 26 and shell during operation of the engine.

Figure 3:
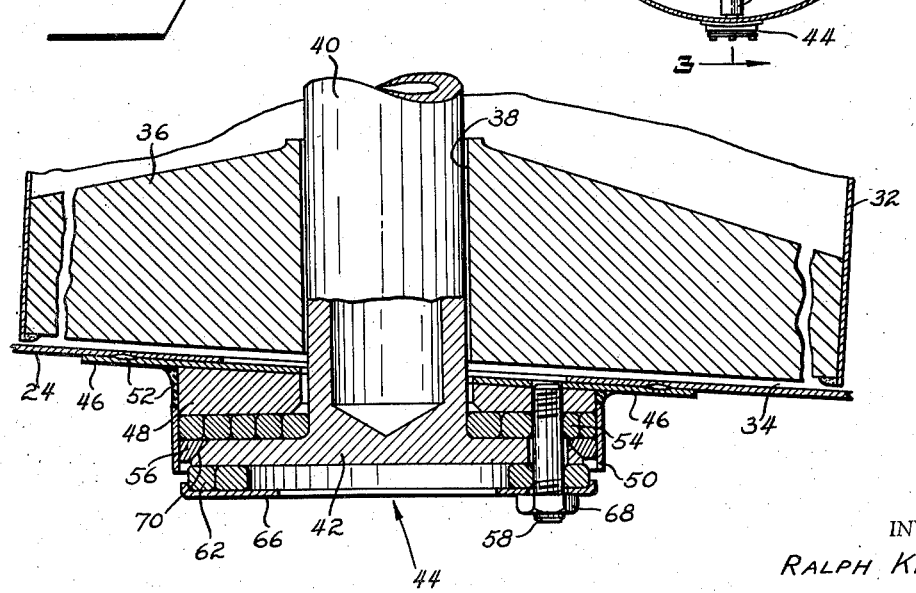
Figure 3 is a detailed elevation taken along line 3—3 of Figure 2.

Struts 32 are hollow and a strut end bearing member 36, Figure 3, is secured as by welding across the open end of each strut. Each member 36 is provided with a smooth bore 38 for slidably receiving the smooth cylindrical shank 40 of a stud 42. Studs 42 are resiliently mounted in accordance with the invention in mounting assemblies 44 which are secured to the shell 24 adjacent the end of each strut. Figure 3 illustrates the details of a resilient mounting assembly 44 comprising an annular plate 46 suitably secured to shell 24 and an annular pad member 48 fastened to the plate. A cylindrical band or ring 50 is mounted on pad 48 and forms therewith a well adapted to receive resilient packing and the enlarged head of stud 42. Band 50, pad 48 and plate 46 are secured together and to shell 24 as by welds 52; and the pad, plate and shell are provided with aligned central openings to permit shank 40 of the stud to extend freely inwardly therethrough into bore 38 of the strut bearing member 36, as shown.

Figure 5:
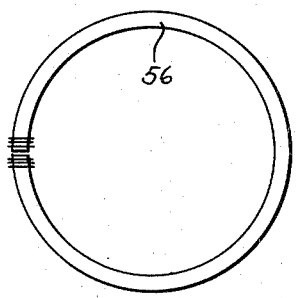
Figure 5 is a plan view of one of the resilient elements of Figure 3.
Figure 7:
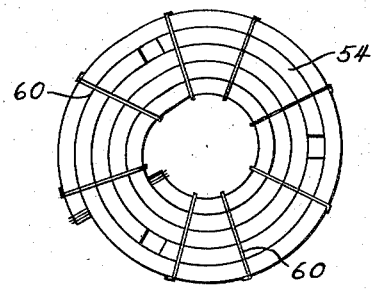
Figure 7 is a plan view of yet another of the resilient elements of Figure 3.

The stud 42 is held in resilient relation to pad 48 by means of an arrangement of resilient gaskets 54 and 56, Figures 3, 5 and 7. These gaskets must be highly heat-resistant and may for example be made of braided metallic material such as square braided Inconel packing of the type disclosed in United States Letters Patent Nos. 2,376,039 and 2,398,210. Gasket 54 comprises a plurality of packing strips, four strips being shown in the illustrated embodiment, Figures 3 and 7, to allow for the passage therethrough of securing bolts 58. These strips are preferably secured together as shown by wire bands 60. Gasket 56 comprises a single strip of packing, Figures 3 and 5, which is mounted outside of gasket 54 adjacent the inner wall of band 50. Alternatively these gaskets may be made of pads of pressed crinkly filamentary material that is high temperature resistant.

Figure 4:
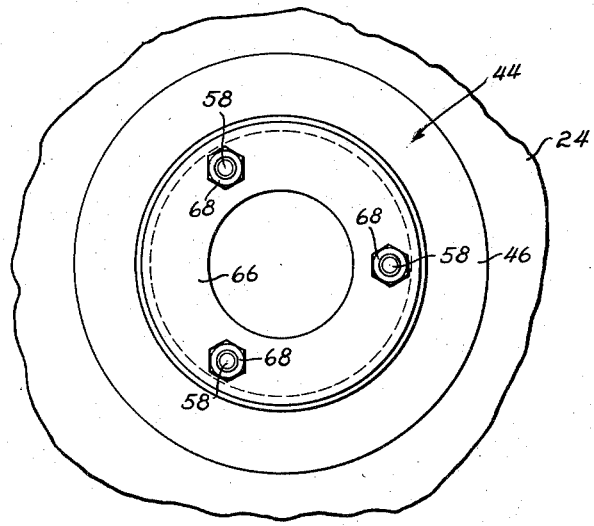
Figure 4 is a plan view of the exterior of the mounting of Figure 3.
Figure 6:
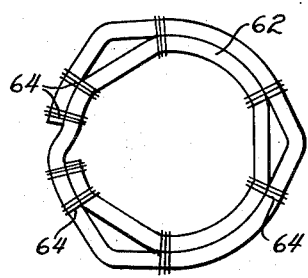
Figure 6 is a plan view of another of the resilient elements of Figure 3.

A third resilient gasket 62 of the same material as gaskets 54 and 56 is positioned outside stud 42. As best seen in Figure 6, gasket 62 is a single strip of packing rolled to form bolt passage holes, and its turns are bound together by wire bands 64. A cover ring 66, Figures 3 and 4, is placed outside gasket 62 and held in place by some means such as nuts 68 threaded on bolts 58. In assembling the mounting 44, after the welded parts have been assembled, bolts 58 are threaded into pad 48 and gaskets 54 and 56 are positioned over and around the bolts as described hereinbefore. The head of stud 42 is formed with bores which register with bolts 58, and the stud is slipped over the bolts with its shank 40 extending into the bore of bridge 36. Gasket 62 is next positioned around the bolts outside of stud 42, and cover ring 66 is placed over the entire assembly and secured in position by nuts 68. As nuts 68 are tightened down gasket 56 will be pressed into a chamfer by the chamfered edge 70 of stud 42 to help seal the assembly against gas losses.

The above-described assembly holds stud 42 in resilient relation to pad 48 with gaskets 54, 56 and 62 arranged to absorb any vibratory stresses transmitted from the tailcone 26 to the outer shell 24 through the stud. Thus, the gaskets actually dampen the stresses so that they do not pass through pad 48 and plate 46 and strain the shell. This effectively eliminates the "tin canning" and breaking out at the abutments of plates 46 that has happened so frequently in the past with rigid mountings. In addition to absorbing vibrations set up in tailcone 26 and stud 42, the gaskets serve to maintain the stud in correct relation to the tailcone and outer shell so that the tailcone is properly positioned and firmly held. At the same time, relative expansion or contraction between the tailcone and shell is permitted because of the slidable relation between the stud shanks 40 and the smooth bores 38 of the strut bridges.

It will be apparent therefore from the foregoing that my invention provides a resilient mounting which not only maintains the diffuser tailcone in its proper position, but which also by effectively damping the sonic and ultrasonic vibrations set up during engine operation materially increases the life of the outer shell. In addition, the mounting assembly is simple and inexpensive and may be readily assembled or disassembled for inspection, replacement or repair of the tailcone and its associated engine parts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a jet engine, a diffuser tail cone comprising an outer shell, an inner tail cone within said shell, a plurality of strut members to support said inner tail cone in said shell, a plurality of stud members passing through said shell into each of said strut members to position said strut members and inner tail cone in said shell, and resilient packing means comprising a plurality of braided metallic gaskets to support said stud members to dampen vibrations tending to pass from said inner tail cone to said outer shell during operation of the engine.

2. In a jet engine diffuser section including an outer shell and an inner tail cone supported in said shell by strut members, a resilient mounting assembly for securing said strut members to said shell comprising a stud element extending through said shell into each of said strut members, highly heat-resistant braided metallic packing between the head of said stud element and said shell, additional resilient highly heat-resistant braided metallic packing outward of and adjacent the head of said stud, a cover member outward of and adjacent said additional packing, and means to secure said cover member to said shell.

3. A mounting assembly as defined in claim 2, wherein the head of said stud element is inwardly chamfered to compress said packing between it and said shell into a gas-tight seal.

4. In a jet engine diffuser tailcone including an outer shell and an inner tailcone supported in said shell by strut members to define therewith an exhaust gas diffusion passage, each of said strut members being formed with a smooth bore in the extremity thereof; a resilient mounting assembly for positioning said strut members in said shell comprising for each strut member a mounting pad secured to the outer surface of said shell, a band member secured to said pad to form therewith a well, a stud element having a head portion positioned in said well and a smooth shank extending through said pad and shell into the bore of the strut member to slidably position it in said shell, resilient packing means in said well between said pad and the head portion of said stud, additional resilient packing means outward of and adjacent the head of said stud, a cover member outward of and adjacent said additional packing means, and means to secure said cover member to said pad whereby the head of said stud is resiliently secured to shell between said packing means.

5. A structure as defined in claim 4, wherein said packing means in said well comprises a plurality of resilient, heat-resistant gaskets, and said additional packing means comprises a single resilient, heat-resistant gasket.

6. In a jet engine, a diffuser tailcone assembly comprising an outer shell, an inner tailcone within said shell, a plurality of strut members rigid with said tailcone and extending radially outward therefrom to a point closely adjacent said shell, a plurality of support members extending substantially normal to the axis of said engine and passing through said shell into each of said strut members and received therein to permit relative radial movement therebetween, means forming a flange on said support members outwardly of said shell, separate heat resistant packing means to support respectively the inner and outer surfaces of said flange to dampen vibrations tending to pass from said inner tailcone to said outer shell during operation of said engine, and means for securing said support members to said shell.

7. In a jet engine diffuser section including an outer shell and an inner tailcone supported in said shell by strut members, a resilient mounting assembly for securing said strut members to said shell comprising a stud element extending through said shell into each of said strut members, means forming a flange on said stud elements outwardly of said shell, resilient packing means between the inner surface of said flange and said shell, additional resilient packing means engaging the outer surface of said flange, a cover member outward of and adjacent said additional packing means, and means to secure said cover member to said shell.

References Cited in the file of this patent

UNITED STATES PATENTS

| | | |
|---|---|---|
| 2,377,492 | Gorton | June 5, 1945 |
| 2,477,501 | Tyler et al. | July 26, 1949 |
| 2,516,819 | Whittle | June 25, 1950 |
| 2,565,733 | Korsberg | Aug. 28, 1951 |
| 2,587,345 | Lombard | Feb. 26, 1952 |
| 2,648,353 | Haworth | Aug. 11, 1953 |

FOREIGN PATENTS

| | | |
|---|---|---|
| 620,446 | Great Britain | Mar. 24, 1949 |